United States Patent
Bolash et al.

[11] Patent Number: 5,940,093
[45] Date of Patent: Aug. 17, 1999

[54] METHOD OF PRINTING WITH AN INK JET PRINTER TO INHIBIT THE FORMATION OF A PRINT ARTIFACT

[75] Inventors: John Philip Bolash; Edmund Holin James, III, both of Lexington, Ky.

[73] Assignee: Lexmark International, Inc., Lexington, Ky.

[21] Appl. No.: 08/818,055

[22] Filed: Mar. 14, 1997

[51] Int. Cl.$^6$ .............................. B41J 29/38; G06F 15/00
[52] U.S. Cl. ............................................. 347/16; 395/111
[58] Field of Search ........................ 347/16, 41, 218, 347/262, 264; 395/111; 346/134; 271/266; 400/630, 578; 226/2

[56] References Cited

U.S. PATENT DOCUMENTS

| | | | |
|---|---|---|---|
| 4,090,205 | 5/1978 | Huffman et al. | 347/16 |
| 4,734,868 | 3/1988 | DeLacy | 395/111 |
| 4,864,328 | 9/1989 | Fischbeck | 347/43 |
| 4,999,646 | 3/1991 | Trask | 347/41 |
| 5,050,858 | 9/1991 | Nakamura | 271/265.1 |
| 5,057,852 | 10/1991 | Formica et al. | 347/43 |
| 5,233,366 | 8/1993 | Stephany | 347/15 |
| 5,349,375 | 9/1994 | Bolash et al. | 347/40 |
| 5,364,461 | 11/1994 | Beach et al. | 106/31.58 |
| 5,371,531 | 12/1994 | Rezanka et al. | 347/43 |
| 5,500,661 | 3/1996 | Matsubara et al. | 347/41 |
| 5,512,923 | 4/1996 | Bauman | 347/15 |
| 5,598,192 | 1/1997 | Burger et al. | 347/43 |

FOREIGN PATENT DOCUMENTS 0 665 116 A2   8/1995   European Pat. Off. .

OTHER PUBLICATIONS

Patent Abstracts of Japan (European Patent Office), Publication No. 07125344; Isono Hajime; Printer and Printing Position Detecting Method of Sheet in Printer; May 16, 1995.

*Primary Examiner*—David F. Yockey
*Attorney, Agent, or Firm*—John J. McArdle

[57] ABSTRACT

A method of printing on a print medium wherein a relocation error is induced in a paper transport system so as to randomize, bias, or redistribute harmonic errors associated with the paper transport system. The print medium is advanced in the ink jet printer in an advance direction to a registration location using the paper transport system. A first subset of an addressable set of ink emitting orifices in the printhead are used to print on the print medium at the registration location. The print medium is then moved in a reverse direction a predetermined distance. The print medium is again advanced in the advance direction and relocated at the registration location using the paper transport system. A second subset of the addressable set of ink emitting orifices in said printhead are used to print on the relocated print medium at the registration location.

2 Claims, 3 Drawing Sheets

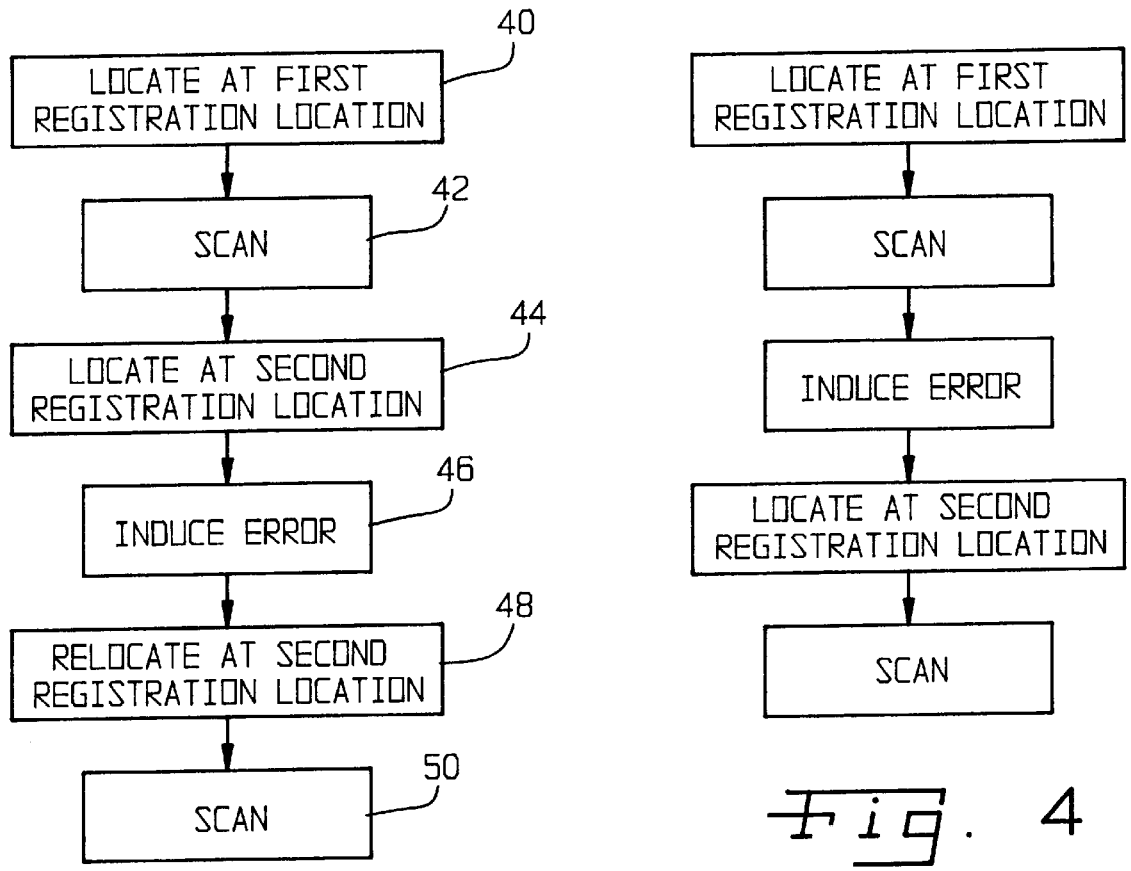
Fig. 3
Fig. 4
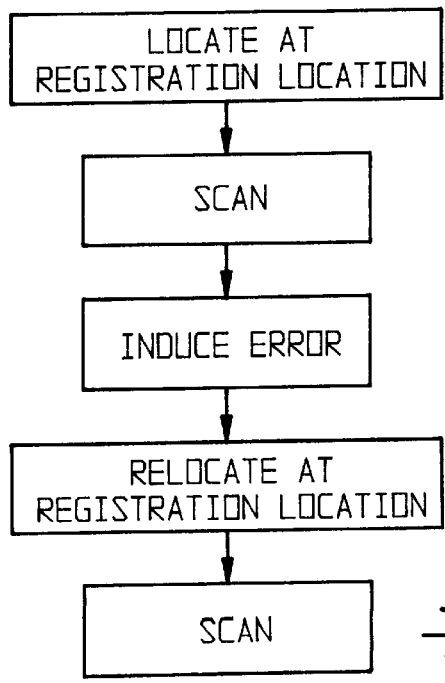
Fig. 5

METHOD OF PRINTING WITH AN INK JET PRINTER TO INHIBIT THE FORMATION OF A PRINT ARTIFACT

BACKGROUND OF THE INVENTION

1. Field of the Invention

The present invention relates to ink jet printers, and, more particularly, to a method of printing using an ink jet printer to inhibit the formation of a print artifact.

2. Description of the Related Art

Color ink-jet printers commonly use a tri-color cyan, magenta and yellow ink cartridge, and a separate single color black ink cartridge. Each cartridge contains multiple orifices through which the distribution of ink onto a page can be controlled. Since the majority of printed documents contain primarily black text, the number of black orifices is normally several times larger than the number of orifices for each of the cyan, magenta, or yellow inks. For example, the tri-color cartridge may contain 16 orifices each for cyan, magenta, and yellow, and the black cartridge may contain 48 black orifices. For manufacturing reasons, there typically exists a four-orifice tall gap between the cyan and magenta orifices, and another four-orifice tall gap between the magenta and yellow orifices.

To render a full color image, the tri-color and black cartridges are passed across a print medium such as paper in a horizontal direction perpendicular to the vertical direction of alignment of the orifices in the cartridges. Between passes of the cartridges, the print medium is moved in the advance direction. For a raster, or row of printed dots, which contains at least one of each of cyan, magenta, yellow, and black dots, the color cartridge must be passed at least three times, once passing to deposit any cyan dots present in the given raster, once passing to deposit any magenta dots, and once passing to deposit any yellow dots. Additionally, the black cartridge must be passed at least once. Of course, for any pass of the color head all 48 color orifices can be used, depositing the cyan, magenta, and yellow inks at different raster locations. The most time efficient technique for depositing ink therefore causes the tri-color cartridge to pass across each raster of the page at most three times, and the black cartridge at most one time.

With a conventional method of printing with a tri-color ink jet printer as described above, objectionable print artifacts may occur because of the sequencing and/or timing between the placement of the different color ink dots on the print medium. For example, print artifacts such as horizontal color/black banding or intercolor bleeding may occur.

One known solution to the problem of a color/black banding artifact is known as shingling or interlaced printing. For a 50% shingling mode (i.e., 2-pass or 50% interlace level), approximately 50% of the dots are placed on any given pass of the cartridge. The candidate dots are selected according to a checkerboard pattern. The remaining 50% of the dots are placed on a subsequent pass of the cartridge. For a raster which contains cyan, magenta, yellow, and black dots, the color cartridge must be passed at least six times, twice depositing any cyan dots present in the given raster, twice depositing any magenta dots, and twice depositing any yellow dots. Additionally, the black cartridge must be passed at least twice.

Another type of print artifact which may occur during printing and is not associated with the sequencing and/or timing between placement of the different color ink dots on the print medium is related to the paper transport system which transports the paper through the ink jet printer in the advance direction. The paper transport system must accurately align the paper in the advance direction at a plurality of locations allowing the cartridges to be scanned across the paper at a plurality of corresponding rasters. The paper transport system typically includes a plurality of rollers which are driven by a plurality of corresponding gears. The gears include a limited degree of manufacturing tolerances allowing sufficient clearances and preventing binding therebetween during use. These manufacturing tolerances may cause errors in the exact placement of each raster relative to a registration location of the paper. Moreover, the stepper motor used to drive the gears includes certain inherent errors associated with movement of the motor between steps. These errors are referred to as "step-to-step errors" and are specified by the manufacturer. Since the stepper motor and gears are rotated, these errors tend to repeat on a cyclical basis, dependent upon the particular rotational orientation of the gears as the gears rotate. The errors associated with the paper transport system therefore tend to be harmonic in nature, dependent upon the particular rotational orientation of the gears. Thus, a print artifact having a "rainbow effect" in color samples and gray scale darkness shifts in monochrome samples may occur in the print image on the paper.

What is needed in the art is a method of printing which inhibits the formation of print artifacts associated with harmonic errors in the paper transport system of the ink jet printer.

SUMMARY OF THE INVENTION

The present invention provides a method of printing with an ink jet printer, wherein a relocation error is induced in the registration location of the print medium between printing scans so as to inhibit the formation of a print artifact.

The invention comprises, in one form thereof, a method of printing on a print medium, such as paper, using a printhead in an ink jet printer. A first subset of an addressable set of ink emitting orifices in the printhead are used to print on the print medium at a first location. The print medium is then moved in a reverse direction a predetermined distance. The print medium is again advanced in the advance direction and relocated at a second location using the print medium transport system. A second subset of the addressable set of ink emitting orifices in said printhead are used to print on the relocated print medium at the registration location.

An advantage of the present invention is that print artifacts caused by harmonic errors in the print medium transport system are inhibited.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3 is a flowchart illustrating one embodiment of the method of the present invention;

FIG. 4 is a flowchart illustrating another embodiment of the method of the present invention; and FIG. 5 is a flowchart illustrating yet another embodiment of the method of the present invention.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
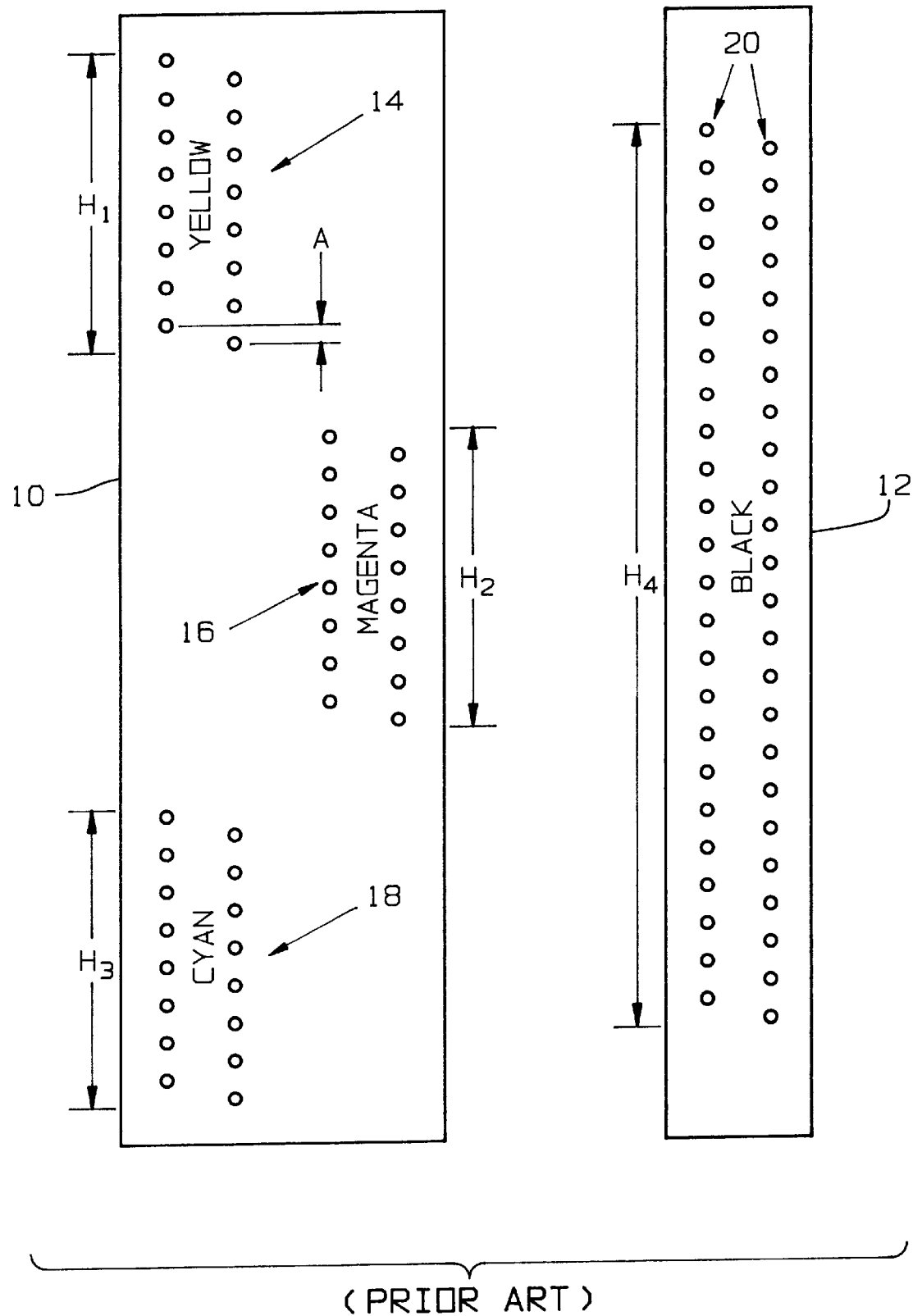
FIG. 1 is a diagrammatic view of a tri-color cartridge having cyan, magenta and yellow orifices and a black cartridge having black orifices, which may be used with the method of the present invention.

Referring now to FIG. 1, an example of a conventional print cartridge which may be used with the method of the present invention is described in greater detail. A color cartridge 10 and black cartridge 12 are carried by a movable carriage (not shown). Color cartridge 10 includes a tri-color printhead defined by a plurality of orifices 14, 16 and 18 for depositing three respective colors of ink on a print medium, such as paper. Orifices 14 define a first array of orifices having a height $H_1$, from which a yellow ink may be jetted onto the print medium. Orifices 16 define a second array of orifices having a height $H_2$, from which a magenta ink may be jetted onto the print medium. Orifices 18 define a third array of orifices having a height $H_3$, from which a cyan ink may be jetted onto the print medium. Color cartridge 10 is therefore capable of jetting three primary color inks onto the print medium using yellow orifices 14, magenta orifices 16 and cyan orifices 18.

In the particular embodiment shown, yellow orifices 14, magenta orifices 16 and cyan orifices 18 each include sixteen (16) orifices, with each array of orifices being disposed in two vertical rows of eight (8) orifices. A distance "A" exists between vertically adjacent orifices 14, 16, and 18. Yellow orifices 14, magenta orifices 16 and cyan orifices 18 are incorporated into a one-piece cartridge in the embodiment shown. It should be appreciated, however, that color cartridge 10 may be constructed as a multiple-piece cartridge, such as a three-piece color cartridge corresponding to each of the color orifices 14, 16 and 18.

Black cartridge 12 includes a black printhead defined by a plurality of orifices 20 defining an array of orifices having a height $H_4$. Orifices 20 are configured to jet a single color ink, namely black ink, on the print medium.

Figure 2:
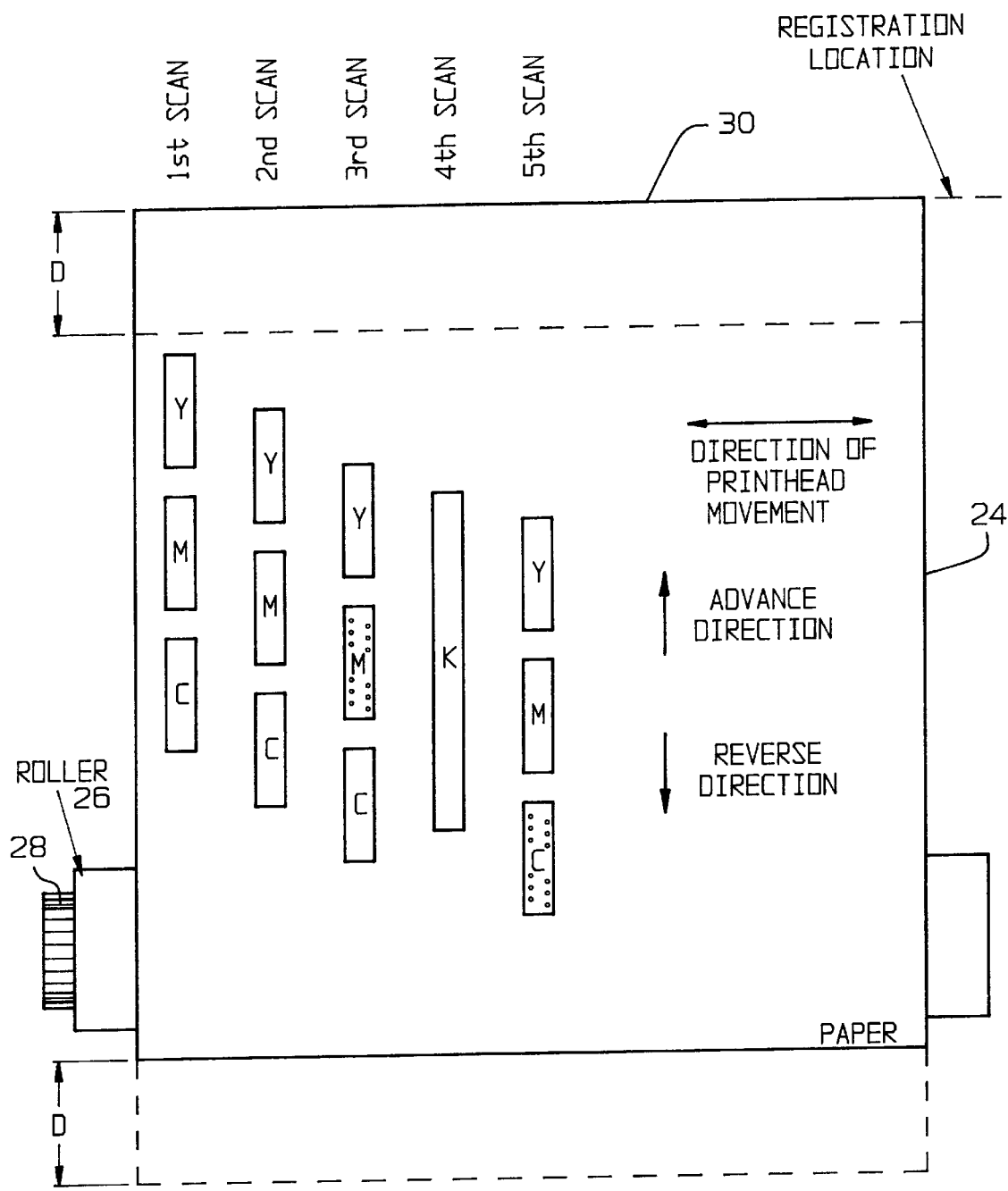
FIG. 2 illustrates an embodiment of a method of printing of the present invention for reducing print artifacts associated with harmonic errors of the paper transport system, using the printhead of FIG. 1 during interlaced printing with 50% shingling (2-pass) for color and black.

Referring now to FIG. 2, an embodiment of the method of printing of the present invention for reducing print artifacts associated with harmonic errors of a paper transport system will be described. In the embodiment shown in FIG. 2, the method of the present invention is carried out using color cartridge 10 and black cartridge 12 shown in FIG. 1, during interlaced printing with 50% shingling (2-pass) for color and black.

Paper 24 is moved through the ink jet printer using a paper transport system defined in part by a roller 26. Roller 26 frictionally engages paper 24. Roller 26 includes a gear 28 which is attached to or integral with an end thereof. Gear 28 includes a plurality of teeth around the circumference thereof which enmesh with teeth on adjacent gears (not shown) in the paper transport system. Rotation of the rollers within the paper transport system, such as roller 26, causes paper 24 to move in the advance direction indicated in FIG. 2.

Roller 26 is also used to align paper 24 at a registration location allowing color cartridge 10 and black cartridge 12 to be aligned relative to and scanned across a plurality of rasters. In the embodiment shown in FIG. 2, the registration location is arbitrarily selected as corresponding to a leading edge 30 of paper 24. That is, the distance between leading edge 30 of paper 24 and a particular raster may be determined for accurately locating color cartridge 10 and black cartridge 12 relative to the particular raster. However, the registration location can be selected to correspond to any location in the advance direction on paper 24. To wit, leading edge 30 of paper 24 may be detected with appropriate sensors and the number of steps associated with a stepper motor used to drive roller 26 may be determined to locate any arbitrarily chosen registration location on paper 24.

A conventional 50% shingling method (with reference to FIG. 2, but disregarding the method of the present invention) involves scanning the color cartridge and placing 50% of the color dots (first pass), moving the paper a distance of 8 orifices (8 * distance A in FIG. 1), scanning the color cartridge and placing 50% of the color dots (second pass), moving the paper a distance of 8 orifices, scanning the color cartridge and placing 50% of the color dots (third pass), moving the paper a distance of 8 orifices, scanning the black cartridge placing 50% of the black dots (fourth pass), not moving the paper, and repeating this sequence (fifth pass, etc.) until the entire document has been printed. A 50% shingling technique as shown in FIG. 2 has the advantage of reducing the objectionable color/black banding artifact previously described. Since only part of the dots are placed on a given pass, some of the dots are given time to dry into the paper prior to additional dots being placed. Other levels of shingling are also possible, for example 25% shingling (4-pass shingling) where approximately 25% of the dots are placed on any given scan of the cartridges.

According to the method of the present invention, paper 24 is moved from an initial registration location in a reverse direction between scans of color cartridge 10 and black cartridge 12 a distance which is sufficient to induce a relocation error as a result of a relocation of paper 24 nominally at the initial registration location, but actually to a second registration location. Thus, the second registration location corresponds to the initial registration location plus or minus the distance associated with the relocation error. This relocation error may be induced in either a random or synchronous manner with respect to the harmonic error associated with the paper transport system. The reverse direction of movement of paper 24 is parallel to but opposite from the advance direction. Between each of the first through the fifth scans shown in FIG. 2, paper 24 is moved in the reverse direction a predetermined distance "D" which is sufficient to cause a relocation error in the drive train of the paper transport system, such as a displacement error associated with the rotational movement of gear 28 of roller 26. The predetermined distance "D" represents the distance which paper 24 is moved in the reverse direction to cause an error in the paper transport system. In the particular embodiment described herein, the predetermined distance "D" is actually more than the distance "A" (FIG. 1) between vertically adjacent pixels. However, in some embodiments, the distance "D" may be equal to or less than "A". Thus, for example, a preferred range of the distance "D" may be between ⅓ to six times the distance "A". In the particular embodiment of FIG. 1, the distance "D" is preferably between about two to three times the distance "A". The distance "D" can nonetheless be any predetermined distance which effects a relocation error to randomize, or bias, the harmonic disturbances in the paper transport system. For example, the harmonic error may be randomized by varying the distance "D" from one inducement of relocation error to the next, or the harmonic error may be biased, or redistributed, by selecting a fixed value for the distance "D". The predetermined distance "D" is shown exaggerated in FIG. 2 for purposes of illustration and clarity.

When carrying out a 50% shingling method as shown in FIG. 2 in conjunction with the method of the present invention, color cartridge 10 is aligned with a first registration location and scanned across paper 24 to selectively deposit ink onto paper 24 from yellow orifices "Y", magenta orifices "M" and cyan orifices "C" (shown in flow chart form in blocks 40 and 42 in FIG. 3). Upon completion of the first scan, paper 24 is advanced a distance corresponding to eight vertically adjacent orifices and aligned with a second registration location (block 44). When the registration location corresponds to leading edge 30 of paper 24, yellow orifices "Y" will thus be disposed a further distance away from leading edge 30 at the second registration location. When positioned at the second registration location, paper 24 is then moved in the reverse direction a predetermined distance "D" causing a relocation error in the paper transport system (block 46), and thereafter moved in the advance direction back to the second registration location (block 48). Color cartridge 10 is then scanned across paper 24 (block 50). Because the second registration location is not aligned relative to the first registration location as a result of the induced relocation error, print artifacts such as rainbow effects in color samples and gray scale darkness shifts in monochrome samples are avoided. The printing process of scanning color cartridge 10 or black cartridge 12, advancing paper 24 to a next registration location, moving paper 24 in a reverse direction to induce a relocation error in the paper transport system, relocating paper 24 at the next registration location with the induced relocation error and printing on paper 24 at the next registration location is repeated until the entire print image is printed on paper 24.

In the embodiment of the method of the present invention described above, the predetermined distance "D" is more than the distance "A" between vertically adjacent orifices in color cartridge 10 or black cartridge 12 and preferably is about two to three times the distance "A". However, the predetermined distance "D" may vary depending upon the manufacturing tolerances of the various components in the paper transport system. The predetermined distance "D" may be relatively easily determined using empirical testing to establish what predetermined distance "D" is required to avoid the formation of print artifacts associated with harmonic errors in the paper transport system.

Additionally, in the embodiment described above, paper 24 is moved in the reverse direction an amount which is sufficient to induce a relocation error in the paper transport system. It is also to be understood, however, that paper 24 may be moved in the advance direction as long as a relocation error is likewise induced in the paper transport system prior to locating or relocating paper 24 at a particular registration location.

Moreover, in the embodiment shown in FIG. 2 and described above, paper 24 is moved in the reverse direction after color cartridge 10 and black cartridge 12 are located relative to a particular scan of the printhead, and before the scan actually occurs. However, it is also possible to scan the printhead, move paper 24 in the reverse direction an amount sufficient to induce a relocation error in the paper transport system, advance paper 24 in the advance direction to the next registration location and then scan the printhead for the next scan. That is, the relocation error may be induced into the paper transport system prior to moving the paper to the next registration location, rather than after the paper is located at the next registration location (FIG. 4).

Additionally, the method of the present invention is described above with reference to and in conjunction with a shingling algorithm. However, the method of printing of the present invention may also be carried out using a conventional printing technique without shingling. That is, paper 24 may be advanced in the advance direction between scans of color cartridge 10 a distance corresponding to the height of yellow orifices "Y", magenta orifices "M" or cyan orifices "C". A relocation error associated with the paper transport system is induced into the registration location for each scan of color cartridge 10 and/or black cartridge 12. The relocation error may be induced into the registration location either immediately before or immediately after the paper is located at the particular registration location, or may also be induced immediately after a particular scan and before the paper is moved to the next registration location.

Furthermore, when the method of the present invention is utilized in conjunction with a non-shingled printing technique, the first registration location and the second registration location occurring before and after movement of the paper to induce a relocation error may in fact coincide or be the same registration location. To wit, a color cartridge 10 as shown in FIG. 1 may be scanned across paper 24 and only one-half of the ink dots placed on paper 24 during the scan. Paper 24 may then be moved in a reverse direction to induce a relocation error and relocated at the same registration location. Color cartridge 10 may then be scanned a second time across paper 24 to deposit the remaining ink dots on paper 24 (FIG. 5). It will be appreciated, however, that an induced relocation error is associated with each separate scan of color cartridge 10.

It is to be understood, and it will be appreciated by those skilled in the art, that the methodology and logic of the present invention described above may be carried out using any number of structural configurations such as electronic hardware, software, and/or firmware, or the like.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of printing on a print medium using a printhead in an ink jet printer, said method comprising the steps of:

advancing the print medium in said ink jet printer in an advance direction to a first registration location using a print medium transport system;

printing on the print medium at said first registration location using a first addressable set of ink emitting orifices in said printhead;

advancing the print medium again in said advance direction and locating the print medium at a second registration location using said print medium transport system;

moving the print medium in a first direction parallel to said advance direction a first distance;

moving the print medium in a second direction opposite to said first direction a second distance to thereby locate the print medium at a randomized second registration location, a difference D between said first distance and said second distance being equal to (y * A), wherein A is a distance between vertically adjacent orifices on the printhead, and y is substantially greater than zero and substantially less than one; and printing on the relocated print medium at said randomized second registration location using a second addressable set of ink emitting orifices in said printhead.

2. The method of claim 1, wherein y is approximately between $\frac{1}{3}$ and $\frac{2}{3}$.

* * * * *